(12) United States Patent
Yoshioka et al.

(10) Patent No.: US 6,692,025 B2
(45) Date of Patent: Feb. 17, 2004

(54) TILT STEERING APPARATUS

(75) Inventors: Koji Yoshioka, Kashiwara (JP); Susumu Imagaki, Tondabayashi (JP)

(73) Assignee: Koyo Seiko, Ltd., Osaka (JP)

( * ) Notice: Subject to any disclaimer, the term of this patent is extended or adjusted under 35 U.S.C. 154(b) by 80 days.

(21) Appl. No.: 09/963,784

(22) Filed: Sep. 27, 2001

(65) Prior Publication Data

US 2002/0038575 A1 Apr. 4, 2002

(30) Foreign Application Priority Data

Oct. 3, 2000 (JP) ........................... 2000-303967

(51) Int. Cl.⁷ ............................................. B62D 1/18
(52) U.S. Cl. ............................. 280/775; 74/492
(58) Field of Search .................. 280/775; 74/492, 74/493

(56) References Cited

U.S. PATENT DOCUMENTS

| | | | | |
|---|---|---|---|---|
| 3,799,569 A | * | 3/1974 | Baker | 280/775 |
| 4,543,848 A | * | 10/1985 | Beauch | 74/493 |
| 4,636,106 A | * | 1/1987 | Waisbrod | 403/228 |
| 4,649,769 A | * | 3/1987 | Venable | 74/493 |
| 4,785,684 A | * | 11/1988 | Nishikawa et al. | 74/493 |
| 5,165,817 A | * | 11/1992 | Hoblingre et al. | 403/373 |
| 5,509,325 A | * | 4/1996 | Thomas | 74/493 |
| 5,632,562 A | * | 5/1997 | Kidzun et al. | 384/536 |
| 5,735,631 A | * | 4/1998 | Patzelt et al. | 403/378 |
| 5,788,277 A | * | 8/1998 | Hibino et al. | 280/775 |
| 5,897,107 A | * | 4/1999 | Zierden et al. | 267/267 |
| 5,915,726 A | * | 6/1999 | Hibino et al. | 280/775 |
| 5,957,613 A | * | 9/1999 | Ruth | 403/48 |
| 5,979,265 A | * | 11/1999 | Kim et al. | 74/493 |
| 6,062,101 A | * | 5/2000 | Higashino | 74/493 |

FOREIGN PATENT DOCUMENTS

| | | | |
|---|---|---|---|
| JP | 6-38458 | * | 2/1994 |
| JP | 9-68249 | * | 3/1997 |
| JP | 10-259839 | * | 9/1998 |
| JP | 10-291673 | * | 11/1998 |
| JP | 2000-038146 | | 8/2000 |

* cited by examiner

Primary Examiner—Paul N. Dickson
Assistant Examiner—George D. Spisich
(74) Attorney, Agent, or Firm—Rabin & Berdo, P.C.

(57) ABSTRACT

A tilt steering apparatus has a pivot fixed to, for example, a pair of fixed side plates of a vehicle body. The pivot is inserted through a connection hole provided in a steering column. At the time of tilt adjustment, the steering column is swung around the pivot. In either one of an inner peripheral surface of the connection hole and an outer peripheral surface of the pivot opposite thereto, a projection extending in a substantially circumferential or axial direction is formed in contact with the other peripheral surface. Consequently, the contact area between the pivot and the connection hole is reduced, thereby reducing friction therebetween. When the pivot is pressed into the connection hole, the projection is suitably crushed, so that fitting between the pivot and the connection hole is loosened, which is useful for the reduction in the friction therebetween.

13 Claims, 6 Drawing Sheets

TILT STEERING APPARATUS

CROSS REFERENCE TO RELATED APPLICATION

The application claims priority benefits under 35 USC §119 of Japanese Patent Application Serial No. 2000-303967 filed on Oct. 3, 2000, the disclosure of which is incorporated by reference.

BACKGROUND OF THE INVENTION

1. Field of the Invention

The present invention relates to a tilt steering apparatus capable of adjusting the height of a steering wheel.

2. Description of Related Arts

In this type of tilt steering apparatus, there is an antinomic request to desire to eliminate backlash at a support of a tilt and make reflection to be resistance in operation as low as possible at the time of operating the tilt.

For example, there is a case where a tilt pivot shaft is inserted through a connection hole of a bracket provided in a steering column, and the steering column is swung around the pivot shaft so that the tilt is adjusted. In this case, it is preferable that a clearance between an outer peripheral surface of the pivot shaft and an inner peripheral surface of the connection hole is as small as possible in order to eliminate the backlash at the support of the tilt, while a large clearance is preferred in order to reduce the friction to be resistance in operation at the time of adjusting the tilt.

In order to satisfy the antinomic request, significantly strict dimensional tolerance is required with respect to the pivot shaft and the connection hole, resulting in increased fabrication cost.

An object of the present invention is to provide a tilt steering apparatus which is low in cost and in which there is no backlash at a support of a tilt and friction at the time of adjusting the tilt is low.

SUMMARY OF THE INVENTION

In order to attain the above-mentioned object, in one aspect of the present invention, a tilt steering apparatus comprises a pivot fixed to a vehicle body; a steering column swung around the pivot at the time of tilt adjustment; a connection hole which is provided in the steering column and through which the pivot is inserted; and a projection formed on either one of an inner peripheral surface of the connection hole and an outer peripheral surface of the pivot opposite thereto so as to extend in a substantially circumferential or axial direction and brought into contact with the other peripheral surface.

In the present embodiment, the pivot and the connection hole are brought into contact with each other at the projection, thereby making it possible to reduce the contact area therebetween. As a result, it is possible to reduce friction created therebetween at the time of operating the tilt. Further, even when the pivot is pressed into the connection hole due to the variation in dimensional tolerance, the projection is easily deformed at the time of the pressing, thereby making it possible to minimize the increase in the friction at the time of relative rotation between the pivot and the connection hole. As a result, the dimensional tolerance need not be strict, thereby making it possible to reduce the fabrication cost.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
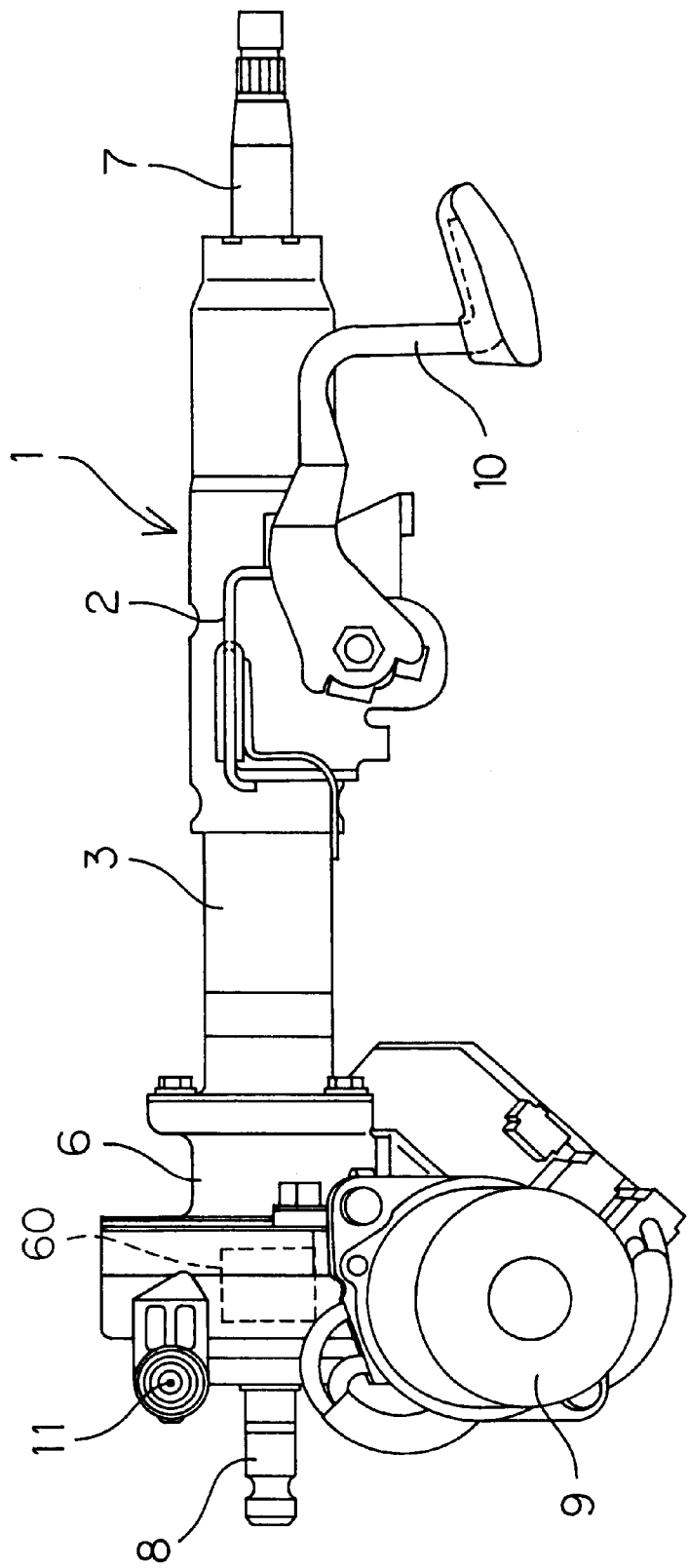
FIG. 1 is a schematic side view of a tilt steering apparatus in an embodiment of the present invention.
Figure 2:
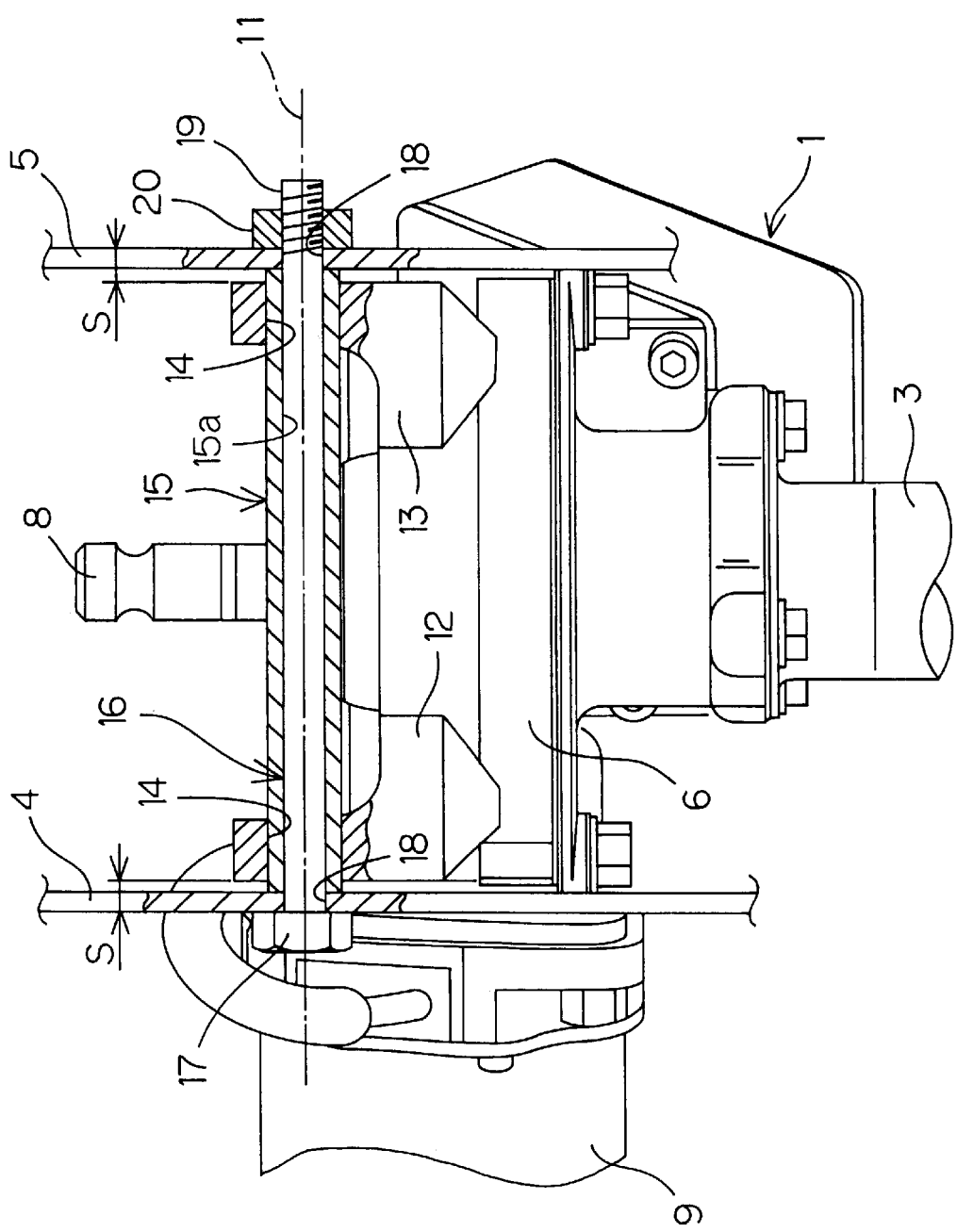
FIG. 2 is a partial broken plan view of the tilt steering apparatus.

A preferred embodiment of the present invention will be described while referring to the accompanying drawings. FIG. 1 is a schematic side view of a principal part of a tilt steering apparatus according to an embodiment of the present invention, and FIG. 2 is a cross-sectional view of a portion in the vicinity of a support of a tilt. Referring to FIG. 1, in the tilt steering apparatus, a steering column 1 comprises an upper column 3 made of a steel tube which is fixed to a vehicle body through an upper bracket 2 and a reduction gear housing 6 made of aluminum alloy casting which is fixed to the vehicle body through a pair of fixed side plates 4 and 5 fixed to the vehicle body (the illustration of the fixed side plates 4 and 5 is omitted. See FIG. 2).

Although in the present embodiment, description is made in conformity with a case where such a so-called waist swinging tilt system that a tilt center axis 11 is arranged in the vicinity of a lower end of the steering column 1 in a column assist type EPS (Electric Power Steering System) is employed, the present invention is not limited to the same.

Referring to FIG. 1, an upper steering shaft 7 is supported on the upper column 3 so as to be rotatable. An output shaft 8 is supported on the reduction gear housing 6 so as to be rotatable. An intermediate shaft is connected to the output shaft 8 through an adjustable joint, which is not shown.

A steering mechanism such as a rack-and-pinion mechanism is connected to a lower end of the intermediate shaft through the adjustable joint. An electric motor 9 is attached to the reduction gear housing 6. The rotation of the electric motor 9 is decelerated by a reduction gear mechanism 60 such as a worm gear mechanism contained in the reduction gear housing 6, and is then transmitted to the output shaft 8, where an auxiliary steering force is given to the steering mechanism. Reference numeral 10 denotes an operation level for locking the steering column in a position where the tilt is adjusted around the tilt center axis 11 and releasing the locking.

Referring to FIG. 2, a pair of stays 12 and 13 serving as brackets arranged between the pair of fixed side plates 4 and 5 is integrally formed in the reduction gear housing 6.

Predetermined clearances S are respectively ensured between the stays 12 and 13 and the corresponding side plates 4 and 5. Connection holes 14 are respectively formed in the stays 12 and 13, and a pivot 15 composed of a hollow steel shaft is fitted in the connection holes 14. The total length of the pivot 15 is set to a length larger than a span between the external dimensions of the stays 12 and 13. Consequently, the predetermined clearances S are ensured.

A fixed shaft 16 for fixing the hollow pivot 15 to the fixed side plates 4 and 5 is inserted through the pivot 15. The fixed shaft 16 has a head 17, for example, and is composed of a screw shaft collectively inserted through an insertion hole 18 for each of the fixed side plates 4 and 5 and the hollow pivot 15. The pair of fixed side plates 4 and 5 and the pivot 15 are integrally interposed between a nut 20 fitted in a screw portion 19 at the head of the fixed shaft 16 and the head 17. That is, the pivot 15 is interposed between the pair of fixed side plates 4 and 5 and fixed therebetween.

The steering column 1 is swung around the pivot 15 thus fixed to the vehicle body, that is, an outer peripheral surface of the pivot 15 and an inner peripheral surface of the connection hole 14 are relatively rotated so that the tilt is adjusted.

Figure 3:
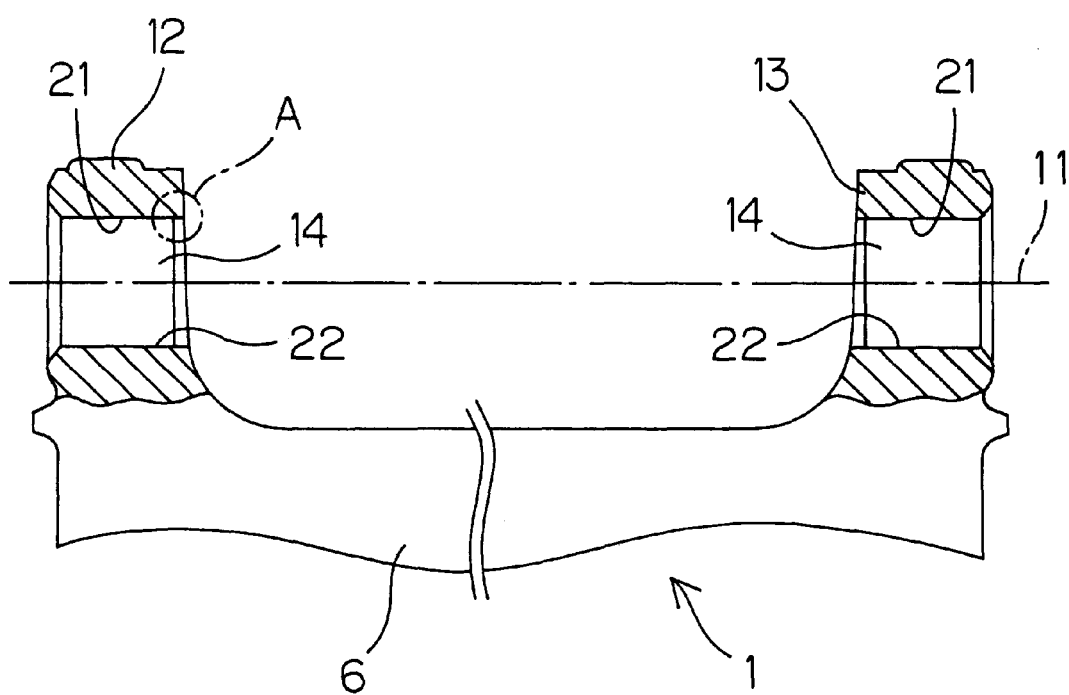
FIG. 3 is a cross-sectional view of the periphery of a connection hole in a stay.
Figure 4:
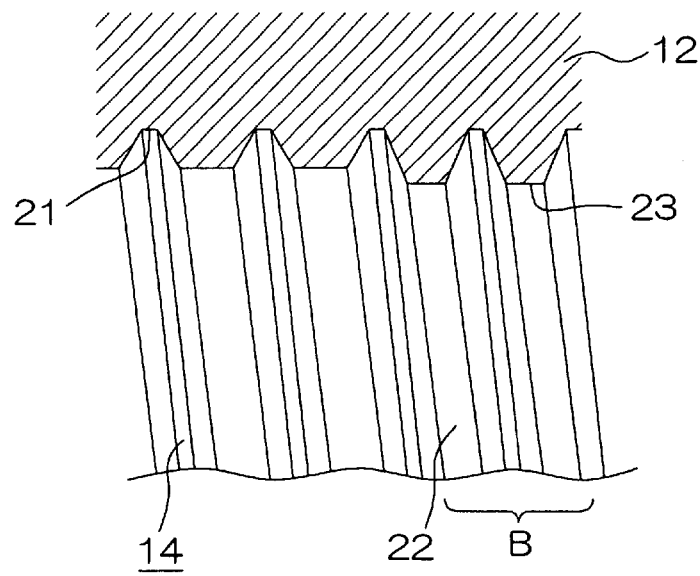
FIG. 4 is an enlarged view of a portion A shown in FIG. 3.

Referring now to FIG. 3 and FIG. 4 which is an enlarged view of a portion A shown in FIG. 3, the present embodiment is characterized in that a thread 22, for example, is formed as a helical projection on an inner peripheral surface 21 of the connection hole 14. As shown in FIG. 4, it is preferable in terms of stabilizing a pressing load as well as reducing metal wear in the connection hole 14 by the pressing that a top 23 of the thread 22 serving as a projection is made slightly flat. Further, the height of the thread 22 may be relatively large only in a region B in the vicinity of an inlet to the connection hole 14. In this case, the pressing load can be further stabilized.

In the present embodiment, the pivot 15 and the connection hole 14 are brought into contact with each other at the thread 22 serving as a projection, to reduce the contact area therebetween. When the pivot 15 and the connection hole 14 are relatively rotated at the time of operating the tilt, therefore, friction created therebetween can be reduced.

Even when the pivot 15 is pressed into the connection hole 14 due to the variation in dimensional tolerance, the thread 22 serving as a projection is easily crushed and deformed at the time of the pressing, so that both are attached to each other by gauging. Even in this case, therefore, it is possible to miniaturize the increase in the friction at the time of relative rotation between the pivot 15 and the connection hole 14. As a result, the dimensional tolerance need not be strict, thereby making it possible to reduce the fabrication cost. Moreover, the operability can be improved by reducing the friction at the time of tilt adjustment.

Particularly when the projection is formed of the thread 22, the boring of a radially inner portion of the connection hole 14 may be only changed into thread cutting. Therefore, the fabrication cost can also remain low from this point.

When a so-called waist swinging tilt system is employed in the column assist type EPS (Electric Power Steering System), as in the present embodiment, a part of the steering column 1 comprises the reduction gear housing 6 composed of aluminum alloy casting, and the stays 12 and 13 each having the connection hole 14 are generally integrally formed in the gear housing 6. That is, the inner peripheral surface 21 of the connection hole 14 is made of an aluminum alloy, and the thread 22 serving as a projection is formed on the inner peripheral surface 21 of the connection hole 14. Even if the pivot 15 is pressed into the connection hole 14, therefore, the thread 22 can be easily crushed and deformed.

Furthermore, the fixing of the pivot 15 by the fixed shaft 16 and the supporting work of the steering column 1 are collectively performed, thereby simplifying the assembling.

Figure 5:
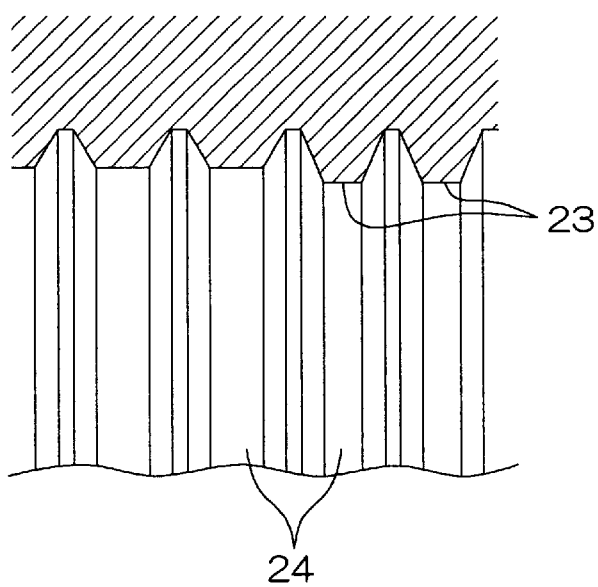
FIG. 5 is an enlarged sectional view of a principal part of a connection hole in another embodiment of the present invention.

The present invention is not limited to the above-mentioned embodiment. For example, a plurality of annular projections 24 may be provided, as shown in FIG. 5, in place of the helical projection 22 shown in FIG. 4.

Figure 6A:
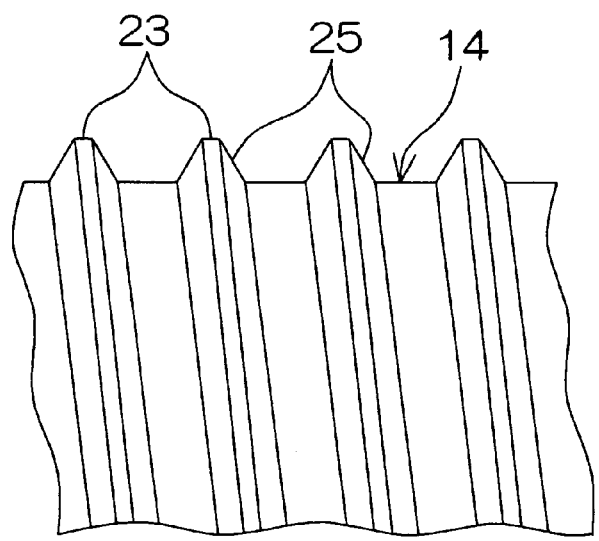
FIGS. 6A and 6B are partial enlarged views each showing a pivot shaft in still another embodiment of the present invention.
Figure 6B:
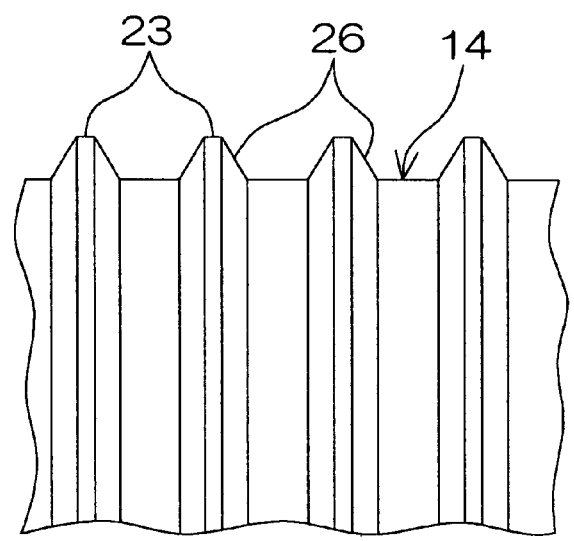

As shown in FIGS. 6A and 6B, the outer peripheral surface of the pivot 15 may be provided with a helical projection 25 and an annular projection 26, and the inner peripheral surface of the connection hole 14 may be made flat.

Each of the annular projections 24 and 26 may be discontinuous in a part of its circumference.

In addition thereto, various modifications can be made in the range of the present invention.

Figure 7:
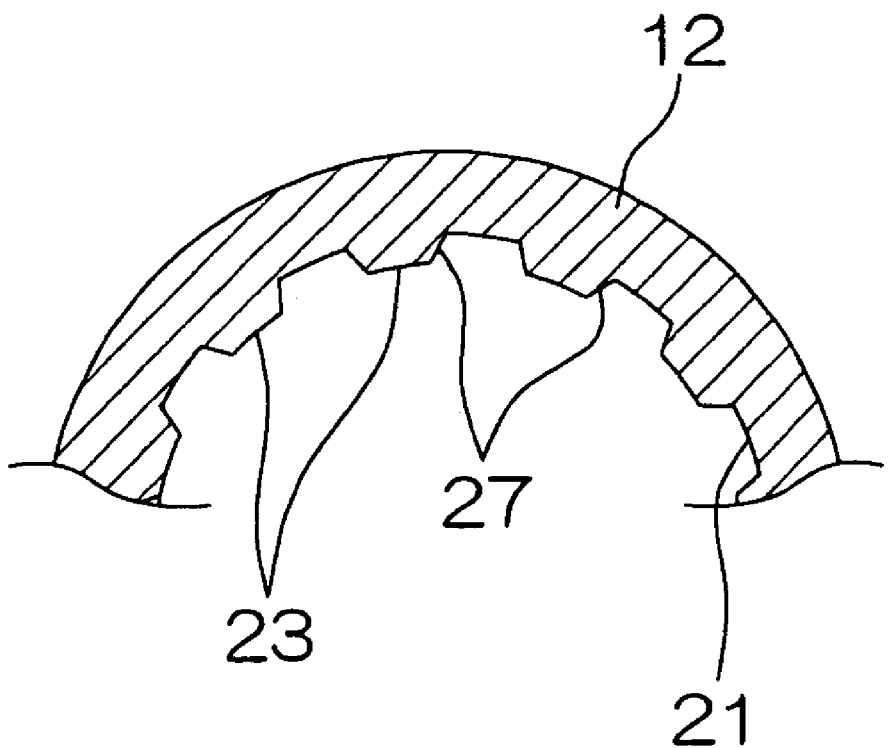
FIG. 7 is an enlarged sectional view of principal part of a connection hole in still another embodiment of the present invention.

As shown in FIG. 7, a projection 27 extending in the axial direction may be provided in the inner peripheral surface of the connection hole 14. The same projection may be provided in the outer peripheral surface of the pivot 15 although it is not shown in the figure. It is preferable that the top 23 of the projection 27 is flat.

Although the present invention has been described and illustrated in detail, it is clearly understood that the same is by way of illustration and example only and is not to be taken by way of limitation, the spirit and scope of the present invention being limited only by the appended claims.

What is claimed is:

1. A tilt steering apparatus comprising:
   a pivot fixed to a vehicle body;
   a steering column swung around the pivot at a time of tilt adjustment;
   a connection hole which is provided in the steering column and through which the pivot is inserted; and
   a plurality of projections formed on and as part of one of an inner peripheral surface of the connection hole and an outer peripheral surface of the pivot opposite thereto, so as to extend in a substantially circumferential or axial direction and brought into contact with the other peripheral surface, one or more of the projections being crushed and plastically deformed when the pivot is inserted into the connection hole.

2. The tilt steering apparatus according to claim 1, wherein the projections include annular projections.

3. The tilt steering apparatus according to claim 1, wherein the projections include helical projections.

4. The tilt steering apparatus according to claim 3, wherein the projections include a thread formed on the inner peripheral surface of the connection hole.

5. The tilt steering apparatus according to claim 1, wherein a top of each of the projections is flat.

6. The tilt steering apparatus according to claim 4, wherein the height of the projections in the vicinity of an inlet to the connection hole is larger than the height of the projections at a distance from the inlet to the connection hole.

7. The tilt steering apparatus according to claim 1, wherein the pivot is composed of a hollow shaft having a through hole axially extending, and the pivot is fixed to the vehicle body with a fixed shaft inserted through the through hole.

8. The tilt steering apparatus according to claim 7, wherein the pivot is interposed between a pair of fixed side plates of the vehicle body, and the fixed shaft is fixed to the pair of fixed side plates in a state where the pivot is interposed between the fixed side plates.

9. The tilt steering apparatus according to claim 1, wherein the steering column comprises a housing composed of an aluminum alloy casting, attached to the vehicle body through the pair of fixed side plates of the vehicle body, and the connection hole is provided in the housing.

10. The tilt steering apparatus according to claim 9, wherein the housing comprises a gear housing containing a reduction gear mechanism for decelerating the rotation of an electric motor for assisting steering.

11. The tilt steering apparatus according to claim 9, wherein the housing comprises a pair of stays integral to the housing arranged between the pair of fixed side plates, and the connection hole is provided in each of the pair of stays.

12. The tilt steering apparatus according to claim 11, wherein predetermined clearances are respectively provided between the pair of fixed side plates and the corresponding stays.

13. The tilt steering apparatus according to claim 1, wherein the pivot is made of steel.

* * * * *